United States Patent
Oh et al.

(10) Patent No.: US 8,932,168 B2
(45) Date of Patent: Jan. 13, 2015

(54) AUTOMATED MANUAL TRANSMISSION

(71) Applicant: Hyundai Motor Company, Seoul (KR)

(72) Inventors: Wan Soo Oh, Hwaseong-si (KR); Heung Seok Lee, Seoul (KR); Jae Woong Hwang, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/796,535

(22) Filed: Mar. 12, 2013

(65) Prior Publication Data

US 2014/0148294 A1    May 29, 2014

(30) Foreign Application Priority Data

Nov. 23, 2012    (KR) .......................... 10-2012-0133902

(51) Int. Cl.
*F16H 48/06*    (2006.01)
*F16H 3/72*    (2006.01)

(52) U.S. Cl.
CPC ............. *F16H 3/725* (2013.01); *Y02T 10/6239* (2013.01); *Y02T 10/6226* (2013.01)
USPC ...................................................... 475/149

(58) Field of Classification Search
USPC ............. 475/149, 5, 330, 150, 151, 152, 198, 475/201, 207, 221, 329, 311
See application file for complete search history.

(56) References Cited

U.S. PATENT DOCUMENTS

| | | | | |
|---|---|---|---|---|
| 5,387,161 | A  * | 2/1995 | Shibahata ......................... | 475/5 |
| 7,086,977 | B2 * | 8/2006 | Supina et al. ..................... | 475/5 |
| 8,475,311 | B2 * | 7/2013 | Ren et al. ......................... | 475/5 |
| 8,622,861 | B2 * | 1/2014 | Nett et al. ......................... | 475/5 |
| 2009/0011887 | A1* | 1/2009 | Komada et al. .................... | 475/5 |

FOREIGN PATENT DOCUMENTS

| | | |
|---|---|---|
| JP | 2000-272360 A | 10/2000 |
| KR | 10-2009-0132758 A | 12/2009 |
| KR | 10-2010-0042964 A | 4/2010 |
| KR | 1020100042964 A | 4/2010 |

* cited by examiner

*Primary Examiner* — Saul Rodriguez
*Assistant Examiner* — David J Hlavka
(74) *Attorney, Agent, or Firm* — Morgan, Lewis & Bockius LLP

(57) ABSTRACT

An automated manual transmission may include first and second auxiliary gears, wherein the first auxiliary gear is rotatably provided on an INPUT shaft to be rotated relatively with respect to the INPUT shaft and wherein the second auxiliary gear is provided on an OUTPUT shaft to be meshed with the first auxiliary gear, a planetary gear unit provided with three or more rotational elements wherein one rotational element thereof receives power from an engine to be rotated constantly and another rotational element thereof is coupled to the first auxiliary gear provided on the INPUT shaft to be rotated, and a motor generator that is coupled to still another rotational element of the rotational elements and provides a rotational power to the still another rotational element in shifting gears so that the rotational power is transmitted to the OUTPUT shaft through the first and second auxiliary gears.

9 Claims, 3 Drawing Sheets

AUTOMATED MANUAL TRANSMISSION

CROSS-REFERENCE TO RELATED APPLICATION

The present application claims priority to Korean Patent Application No. 10-2012-0133902 filed on Nov. 23, 2012, the entire contents of which is incorporated herein for all purposes by this reference.

BACKGROUND OF THE INVENTION

1. Field of the Invention

The present disclosure relates to an automated manual transmission, capable of improving non-smooth shifting, such as pulling, when shifting of the automated manual transmission.

2. Description of Related Art

An automated manual transmission is shifted automatically by an actuator while a vehicle travels so that it can provide convenience similar to an automatic transmission and contribute to improving fuel efficiency of a vehicle with power transmission efficiency better than an automatic transmission.

However, for an automated manual transmission based on a shifting mechanism of a synchro-mesh type, power is necessarily instantaneously blocked even during a shifting that is automatically performed by an actuator.

FIG. 1 is a view comparing a torque decline curve due to an engine power blocking in an automated manual transmission for a vehicle and a torque compensation curve of the torques compensated, according to a related art wherein as shown in the drawing, the non-smooth shifting as if a vehicle is pulled back due to the torque decline is accompanied in the automated manual transmission for a vehicle according to a related art.

Meanwhile, in Korean Patent Laid-Open No. 10-2010-0042964, a technology of "Automated manual transmission" has been disclosed.

However, the non-smooth shifting due to power block during a shifting of gears is not sufficiently prevented by the related art.

The description provided above as a related art of the present invention is just for helping understanding the background of the present invention and should not be construed as being included in the related art known by those skilled in the art.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an automated manual transmission that can compensating torque decline produced during a shifting with power supplied from a motor generator and prevent the toques decline by providing power to an OUTPUT shaft through the motor generator during a shifting through a manual shifting mechanism.

In an aspect of the present invention, an automated manual transmission may include first and second auxiliary gears, wherein the first auxiliary gear is rotatably provided on an INPUT shaft to be rotated relatively with respect to the INPUT shaft and wherein the second auxiliary gear is provided on an OUTPUT shaft to be meshed with the first auxiliary gear, a planetary gear unit provided with three or more rotational elements wherein one rotational element thereof receives power from an engine to be rotated constantly and another rotational element thereof is coupled to the first auxiliary gear provided on the INPUT shaft to be rotated, and a motor generator that is coupled to still another rotational element of the rotational elements and provides a rotational power to the still another rotational element in shifting gears so that the rotational power is transmitted to the OUTPUT shaft through the first and second auxiliary gears.

The INPUT shaft is coupled to a clutch and selectively receives the power from the engine by operation of the clutch, In another aspect of the present invention, an automated manual transmission may include an INPUT shaft that is coupled to a clutch and selectively receives power from an engine by operation of the clutch, an OUTPUT shaft that is arranged in parallel to the INPUT shaft, a first auxiliary gear that is rotatably provided on the INPUT shaft to be rotated relatively with respect to the INPUT shaft, a second auxiliary gear that is provided on the OUTPUT shaft and is meshed with the first auxiliary gear, a planetary gear unit provided with three or more rotational elements wherein one rotational element thereof receives the power from the engine to be rotated constantly, and another rotational element thereof is coupled to the first auxiliary gear to be rotated with the first auxiliary gear, and a motor generator that is coupled to still another rotational element and provides a rotational power to the still another rotational element in shifting gears so that the rotational power is transmitted to the OUTPUT shaft through the another rotational element coupled to the first auxiliary gear, the first auxiliary gear and the second auxiliary gear in sequence.

In the planetary gear unit, the rotational element that receives the power from the engine to be rotated constantly is a carrier, the another rotational element coupled to the first auxiliary gear is a sun gear, and the still another rotational element coupled to the motor generator is a ring gear.

In the planetary gear unit, the rotational element that receives power from the engine to be rotated constantly is a sun gear, the another rotational element coupled to the first auxiliary gear is a carrier gear, and the still another rotational element coupled to the motor generator is a ring gear.

The planetary gear unit and the motor generator are arranged coaxially with the INPUT shaft.

A coupling shaft is arranged coaxially with the INPUT shaft to be rotated relatively with respect to the INPUT shaft wherein one end of the coupling shaft is fixed to the first auxiliary gear and the other end thereof is fixed to the another rotational element coupled to the first auxiliary gear.

The planetary gear unit is a single pinion planetary gear unit.

The motor generator is arranged between the first auxiliary gear and the planetary gear unit.

The rotational element that receives power from the engine is coupled to a clutch cover.

The motor generator generates the rotational power when a vehicle coasts.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g.

fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
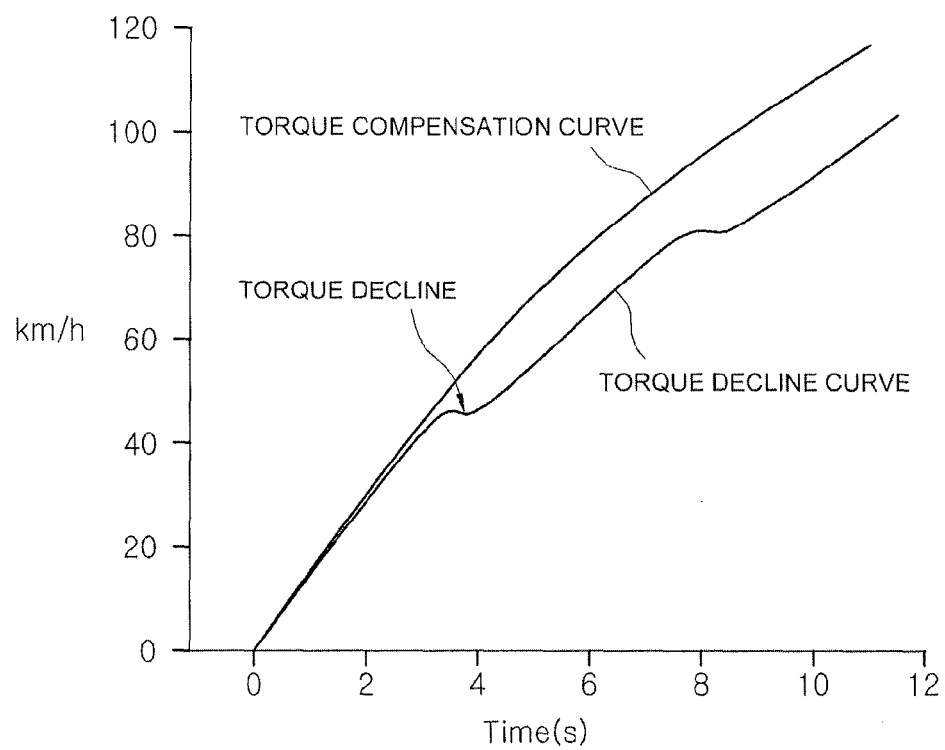
FIG. 1 is a view comparing a torque decline curve due to an engine power blocking in an automated manual transmission for a vehicle and a torque compensation curve of the torques compensated, according to a related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
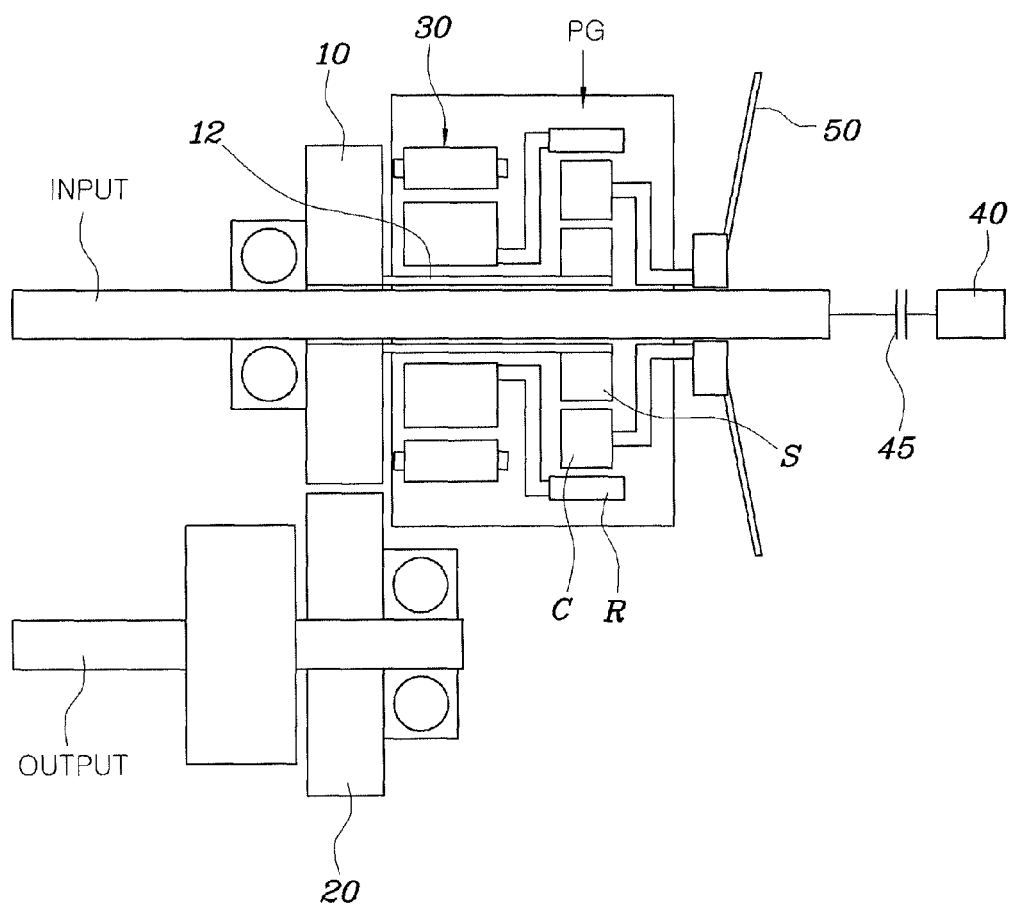
FIG. 2 is a view showing a planetary gear unit and a motor generator for compensating torque in an automated manual transmission according to various exemplary embodiments of the present invention.
Figure 3:
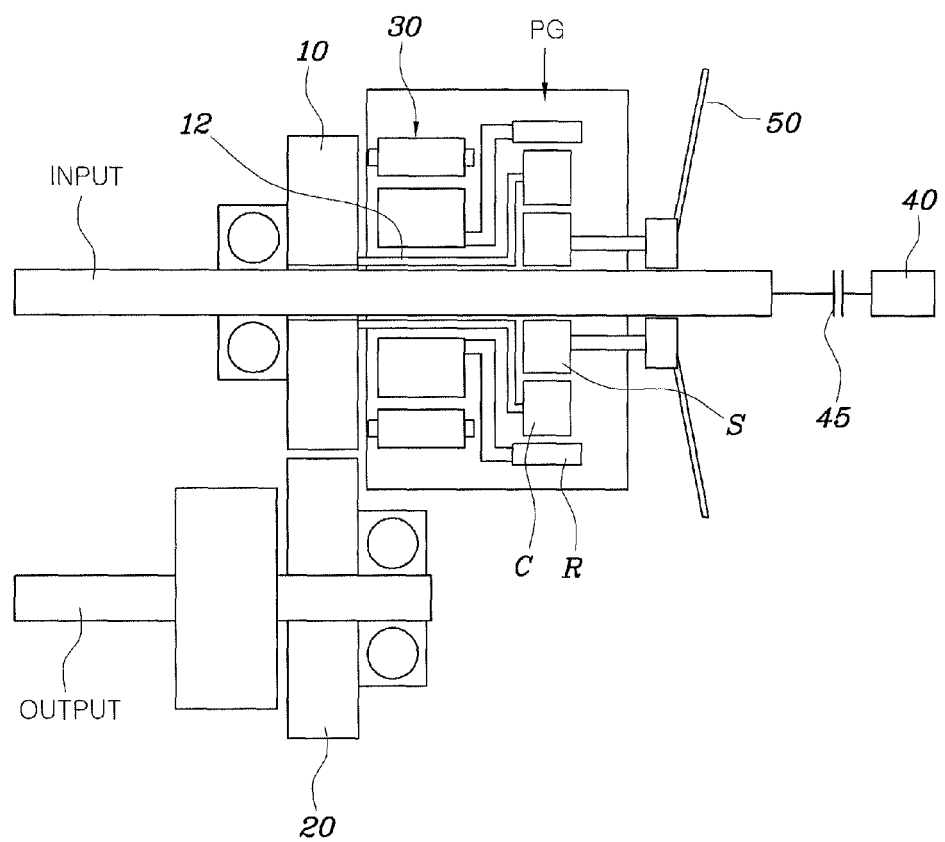
FIG. 3 is a view showing a planetary gear unit and a motor generator for compensating torque in an automated manual transmission according to a second embodiment of the present invention.

FIG. 2 is a view showing a planetary gear unit PG and a motor generator 30 for compensating torque in an automated manual transmission according to a first embodiment of the present invention, and FIG. 3 is a view showing a planetary gear unit PG and a motor generator 30 for compensating torque in an automated manual transmission according to a second embodiment of the present invention.

Referring to FIGS. 2 and 3, the automated manual transmission according to an exemplary embodiment of the present invention may include mainly a pair of auxiliary gears, a planetary gear unit PG and a motor generator 30.

In detail, the automated manual transmission according to an exemplary embodiment of the present invention may include: a pair of auxiliary gears one of which is provided on an INPUT shaft to be rotated relatively and the other of which is provided on an OUTPUT shaft wherein they are meshed each other to transfer rotational power, a planetary gear unit PG where three or more rotational elements are provided wherein one rotational element of them is rotated constantly with power transmitted from an engine 40 and another rotational element of them is coupled to the auxiliary gear provided on the INPUT shaft, to be rotated, and a motor generator 30 that is coupled to still another rotational element of the rotational elements and transfers the rotational power to the still another rotational element during a shifting of gears and thus the rotational power is transmitted to the OUTPUT shaft through the pair of auxiliary gears.

Meanwhile, an automated manual transmission according to an exemplary embodiment of the present invention may include mainly an INPUT shaft, an OUTPUT shaft, a first auxiliary gear 10, a second auxiliary gear 20, a planetary gear unit PG and a motor generator 30.

Referring to FIGS. 2 and 3, the automated manual transmission according to an exemplary embodiment of the present invention may include: an INPUT shaft that is coupled to a clutch 45 and receives selectively power form an engine 42, an OUTPUT shaft that is arranged in parallel to the INPUT shaft, a first auxiliary gear 10 that is provided to be rotated relatively to the INPUT shaft, a second auxiliary gear 20 that is provided on the OUTPUT shaft and meshed with the first auxiliary gear 10 to transfer the rotational power, a planetary gear unit PG where three or more rotational elements are provided wherein one rotational element of them is rotated constantly with power transmitted from an engine 40 and another rotational element of them is coupled to the first auxiliary gear 10 to be rotated, and a motor generator 30 that is coupled to still another rotational element of the rotational elements and transfers the rotational power to the still another rotational element during a shifting of gears and thus the rotational power is transmitted to the OUTPUT shaft through the rotational element coupled to the first auxiliary gear 10, the first auxiliary gear 10 and the second auxiliary gear 20.

In addition to the configurations as described-above, first, the INPUT shaft is coupled to the clutch 45 wherein the INPUT shaft may be rotated by receiving selectively power of the engine 40 through a coupling and uncoupling of the clutch 45.

Here, the OUTPUT shaft may be arranged in parallel to the INPUT shaft and further shifting stage gears of an manual shifting mechanism may be mounted on the INPUT shaft and the OUTPUT shaft. That is, gears constituting the respective shifting stages may be arranged as pairs and a synchronizing unit is arranged partially between the respective pairs of gears so that the pair of gear is synchronized and meshed through the synchronizing unit to perform a shifting.

The power from the engine 42 is transmitted to the INPUT shaft through the manual shifting mechanism when a vehicle travels and further the rotation power transmitted to the INPUT shaft is transmitted to the pair of gears in the shifting stages to perform the shifting, and the shifted rotational power is transmitted to the OUTPUT shaft and then the rotational power is transmitted to driving wheels.

The first auxiliary gear 10 may be arranged on the INPUT shaft to be rotated relatively and coupled to one rotational element of the rotational elements of the planetary gear unit PG so that the first auxiliary gear 10 is rotated in accordance with a rotation of the one rotation element.

Here, the first auxiliary gear 10 may be coupled to the one rotational element by the INPUT shaft. That is, a coupling shaft 12 may be arranged coaxially with the INPUT shaft in a shape of surrounding the INPUT shaft wherein the coupling shaft is arranged to be rotated relatively to the INPUT shaft.

Furthermore, one end of the coupling shaft 12 may be coupled to the first auxiliary gear 10 and the other end thereof may be coupled to the one rotational element coupled to the first auxiliary gear 10 wherein the first auxiliary gear 10 may be rotated separately from the INPUT shaft and it may be a needle bearing or a bush.

Also, the second auxiliary gear 20 may be provided on the OUTPUT shaft to be rotated together with the OUTPUT shaft and may be meshed with the first auxiliary gear 10 to be engaged and rotated. As a result, the rotational force transmitted from the planetary gear unit PG to the first auxiliary gear 10 may be transmitted to the OUTPUT shaft through the second auxiliary gear 20 and also the rotational force transmitted from the OUTPUT shaft to the second auxiliary gear 20 may be transmitted to the motor generator 30 coupled to one rotational element of the planetary gear unit PG, through the first auxiliary gear 10.

Meanwhile, three or more rotational elements may be provided on the planetary gear unit PG wherein one rotational element of them is rotated constantly by receiving power from the engine 42, another rotation element of them is coupled to the first auxiliary gear 10 to be rotated, and still another rotational element of them is coupled to the motor generator 30.

That is, the rotational elements may be a sun gear S, a carrier C and a ring gear R, respectively, wherein the three rotational elements are coupled independently to the engine 42, the first auxiliary gear 10 and the second auxiliary gear 20, respectively.

Here, the planetary gear unit PG may be a single pinion planetary gear unit provided with the sun gear S, the carrier C and the ring gear R in a radial direction from a central shaft.

The planetary gear unit PG may be arranged coaxially with the INPUT shaft. That is, the planetary gear unit PG may be arranged on the INPUST shaft.

Referring to FIG. 2, for a coupling configuration of the rotational elements according to a first embodiment of the present invention, the rotational element that receives power from the engine 40 to be rotated constantly may be the carrier C, the rotational element coupled to the first auxiliary gear 10 may be the sun gear S, and the rotational element coupled to the motor generator 30 may be the ring gear R.

Further, referring to FIG. 3, for a coupling configuration of the rotational elements according to a second embodiment of the present invention, the rotational element that receives power from the engine 40 to be rotated constantly may be the sun gear S, the rotational element coupled to the first auxiliary gear 10 may be the carrier C, and the rotational element coupled to the motor generator 30 may be the ring gear R.

Here, the rotational element that receives power from the engine 40 may be coupled to a clutch cover 50. That is, the clutch cover 50 is coupled to a fly wheel of the engine 40 to be rotated constantly together with the engine wherein the rotational element is coupled to the clutch cover and thus it is to be rotated constantly.

That is, in case of the first embodiment as shown in FIG. 2, the rotational element to be coupled to the clutch cover 50 is the carrier C, and in case of the second embodiment as sown in FIG. 2, the rotational element to be coupled to the clutch cover 50 is the sun gear S.

The motor generator 30 is coupled to the still another rotational element of other rotational elements of the planetary gear unit PG and it is coupled to the ring gear R, as described-above. As a result, the motor generator supplies rotational force to the ring gear R when shifting of gears, and the rotational force is transmitted to the OUTPUT shaft through the rotational element coupled to the first auxiliary gear 10, the first auxiliary gear 10 and the second auxiliary gear 20.

That is, the power from the engine 40 is blocked through a clutch 45 when shifting gears, and thus the rotational power is not transmitted to the INPUT shaft. At this time, the power is transmitted to the OUTPUT shaft through the motor generator 30 such that at the moment when the power is blocked through the clutch 45 and the syncro device when shifting gears, the rotational power of the motor generator 30 is transmitted to the OUTPUT shaft through the planetary gear unit PG and a pair of auxiliary gear thereby preventing a torque decline phenomenon during a shifting.

Here, the motor generator 30 may be arranged coaxially with the INPUT shaft wherein it may be arranged between the first auxiliary gear 10 and the planetary gear unit PG.

Specially, the motor generator 30 may be configured to generate power when a vehicle coasts. That is, when a vehicle coasts, the rotational force transmitted from a wheel to the OUTPUT shaft is transmitted to the first auxiliary gear 10 through the second auxiliary gear 20 and thus the rotational element coupled to the first auxiliary gear 10 to rotate the ring gear R. Accordingly, power may be generated through the motor generator 30 coupled to the ring gear R.

An operation and effects of the present invention will be described referring to FIGS. 2 and 3.

Referring to FIG. 2, the power from the engine 40 is not transmitted to the OUTPUT shaft by a decoupling of the clutch 45 and syncro device when shifting gears.

At this time, when the rotational power form the motor generator 30 is supplied to the ring gear R and the ring gear R is rotated, the sun gear S is rotated together through the carrier C in accordance with a rotation of the ring gear R. Here, the carrier C is coupled to the engine 40 to be rotated constantly wherein the rotational power of the ring gear R is transmitted to the sun gear S through the carrier C.

Next, the first auxiliary gear 10 coupled to the sun gear S is rotated together and the second auxiliary gear 20 meshed with the first auxiliary gear 10 is rotated together with the OUTPUT shaft.

Referring to FIG. 3, the power form the engine 40 is not transmitted to the OUTPUT shaft by a decoupling of the clutch 45 and syncro device when shifting gears.

At this time, when the rotational power form the motor generator 30 is supplied to the ring gear R and the ring gear R is rotated, the sun gear S is rotated together through the carrier C in accordance with a rotation of the ring gear R. Here, the sun gear S is coupled to the engine 40 to be rotated constantly wherein the rotational power of the ring gear R is transmitted to the carrier C for rotating it.

Next, the first auxiliary gear 10 coupled to the carrier C is rotated together and the second auxiliary gear 20 meshed with the first auxiliary gear 10 is rotated together with the OUTPUT shaft.

Through this configuration as described-above, the rotational power of the motor generator 30 when shifting gears is transmitted to the OUTPUT shaft thereby resolving gear cutting-off and improving not-sooth shifting.

According to an exemplary embodiment of the present invention, a rotational power from a motor generator is supplied to an OUTPUT shaft through a planetary gear unit during a shifting through an automated manual mechanism so that a torque decline can be removed by compensating the torques decline produced during the shifting with the rotational power supplied from the motor generator and further smooth and stable shifting feeling can be obtained thereby improving commerciality of the vehicle product.

Further, the rotational force that is transmitted from a wheel to an OUTPUT shaft is input reversely to the motor generator through the planetary gear unit when a vehicle coasts and thus power can be generated through the motor generator.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An automated manual transmission comprising:
    an INPUT shaft that is coupled to a clutch and selectively receives power from an engine by operation of the clutch;
    an OUTPUT shaft that is arranged in parallel to the INPUT shaft;
    a first auxiliary gear that is rotatably provided on the INPUT shaft to be rotated relatively with respect to the INPUT shaft;
    a second auxiliary gear that is provided on the OUTPUT shaft and is meshed with the first auxiliary gear;
    a planetary gear unit mounted to the INPUT shaft and provided with three or more rotational elements wherein one rotational element thereof receives a rotational power from the engine to be rotated constantly, and another rotational element thereof is coupled to the first auxiliary gear to be rotated with the first auxiliary gear; and
    a motor generator that is directly coupled to still another rotational element and provides a rotational power to the still another rotational element during shifting gears so that the rotational power is transmitted to the OUTPUT shaft through the another rotational element coupled to the first auxiliary gear, the first auxiliary gear and the second auxiliary gear in sequence,
    wherein a path of the rotational power from the motor generator to the still another rotational element and a path of the rotational power from the engine to the one rotational element through the INPUT shaft are independent each other.

2. The automated manual transmission according to claim 1, wherein in the planetary gear unit, the rotational element that receives the power from the engine to be rotated constantly is a carrier, the another rotational element coupled to the first auxiliary gear is a sun gear, and the still another rotational element coupled to the motor generator is a ring gear.

3. The automated manual transmission according to claim 1, wherein in the planetary gear unit, the rotational element that receives power from the engine to be rotated constantly is a sun gear, the another rotational element coupled to the first auxiliary gear is a carrier gear, and the still another rotational element coupled to the motor generator is a ring gear.

4. The automated manual transmission according to claim 1, wherein the planetary gear unit and the motor generator are arranged coaxially with the INPUT shaft.

5. The automated manual transmission according to claim 1, wherein a coupling shaft is arranged coaxially with the INPUT shaft to be rotated relatively with respect to the INPUT shaft wherein one end of the coupling shaft is fixed to the first auxiliary gear and the other end thereof is fixed to the another rotational element coupled to the first auxiliary gear.

6. The automated manual transmission according to claim 1, wherein the planetary gear unit is a single pinion planetary gear unit.

7. The automated manual transmission according to claim 1, wherein the motor generator is arranged between the first auxiliary gear and the planetary gear unit.

8. The automated manual transmission according to claim 1, wherein the rotational element that receives power from the engine is coupled to a clutch cover.

9. The automated manual transmission according to claim 1, wherein the motor generator generates the rotational power when a vehicle coasts.

* * * * *